United States Patent [19]
Lewis
[11] Patent Number: 4,779,099
[45] Date of Patent: Oct. 18, 1988

[54] CLAMP FOR AND METHOD OF FABRICATING A MULTI-LAYER INK JET APPARATUS

[75] Inventor: Arthur M. Lewis, Danbury, Conn.

[73] Assignee: Dataproducts Corporation, Woodland Hills, Calif.

[21] Appl. No.: 17,855

[22] Filed: Feb. 24, 1987

[51] Int. Cl.$^{4}$ ........................ G01D 9/00; G01D 15/16
[52] U.S. Cl. .................................. 346/1.1; 346/140 R
[58] Field of Search .............. 346/139 R, 140 PD, 1.1

[56] References Cited

U.S. PATENT DOCUMENTS 4,392,145 7/1983 Parkola ........................ 346/140 PD
4,439,780 3/1984 DeYoung ...................... 346/140 PD
4,599,628 7/1986 Doring et al. ............... 346/140 PD
4,623,904 11/1986 Conta et al. .................. 346/140 PD
4,680,595 7/1987 Cruz-Uribe et al. ................ 346/1.1

FOREIGN PATENT DOCUMENTS 2182611 5/1987 United Kingdom .

*Primary Examiner*—E. A. Goldberg
*Assistant Examiner*—Mark Reinhart
*Attorney, Agent, or Firm*—Woodcock Washburn Kurtz Mackiewicz & Norris

[57] ABSTRACT

An impulse ink jet apparatus includes a plurality of lengthwise expandable piezoelectric transducers, each of the transducers varying the volume of a small compression chamber which is supplied ink from a reservoir by an ink flow path defined by a stack of thin plates held together upon the rigid forward face of a print head by a spring plate and U-clip.

23 Claims, 2 Drawing Sheets

CLAMP FOR AND METHOD OF FABRICATING A MULTI-LAYER INK JET APPARATUS

BACKGROUND OF THE INVENTION

This invention relates generally to ink jet arrays including a plurality of ink jet channels wherein each channel includes a chamber, an inlet to the chamber, an orifice from the chamber, and transducer means coupled to the chamber for ejecting droplets of ink from the chamber as a function of the state of energization of the transducer means. More specifically, this invention relates to a simplified method of constructing an impulse ink jet apparatus.

In liquid droplet ejecting systems of the drop-on demand type, such as impulse ink jet printers, a piezoceramic transducer is used to cause expulsion of ink as droplets from a small nozzle or jet. An array of such jets is often utilized in high-speed, high-resolution printers where, as is well-known, the printing rate and printed image resolution is dependent upon the number of jets and spacing therebetween. In general, the closer the jets are to one another, the faster the images can be produced and the higher the resulting image resolution.

One suitable such printer is described in U.S. Pat. No. 4,459,601, issued July 10, 1984 to Stuart D. Howkins, assigned to the assignee of the present invention and incorporated herein by reference. In that arrangement, an ink jet apparatus of the demand or impulse type comprises a chamber and an orifice from which droplets of ink are ejected in response to the state of energization of a transducer which communicates with the chamber through a foot forming a movable wall. The transducer expands and contracts, in a direction having at least one component extending parallel with the direction of droplet ejection through the orifice, and is elongated in such direction, the electric field resulting from the energizing voltage being applied transverse to the axis of elongation.

One problem common to all high-speed, high-resolution, drop-on-demand ink jet printers occurs because the jets of an array are spaced very close to one another. That is, the response of one jet in an array to its drive voltage can be affected by the simultaneous application of a drive voltage to another nearby jet. This can result in a phenomenon, known in the art as "mechanical cross-talk", where pressure waves are transmitted through the solid material in which the jets are formed, or in another phenomenon, known in the art as "electrical cross-talk", where relatively large drive voltages necessary for substantial displacement of transducers utilized in the prior art cause the subsequent pulsing of an inappropriate jet.

While the risk of electrical cross-talk between ink jets in an array utilizing the teachings of U.S. Pat. No. 4,459,601 as discussed above will be minimized, the risk of mechanical cross-talk remains. One approach which alleviates this problem, however, is discussed in U.S. Pat. No. 4,439,780, issued Mar. 27, 1984 to Thomas W. DeYoung and Viacheslav B. Maltsev, assigned to the assignee of the present invention and incorporated herein and by reference. In that arrangement, an ink jet array comprises a plurality of elongated transducers coupled to a plurality of ink jet chambers, the transducers being supported only at their longitudinal extremities. The support at the extremity remote from the chamber is provided such that no longitudinal motion along the axis of elongation of the transducers occurs, while the other extremity includes bearing means which substantially preclude lateral movement of the transducers transverse to their axis of elongation but permit the longitudinal movement thereof along the axis, thus minimizing mechanical cross-talk between ink jets within the array. Other characteristic problems which are encountered in the implementation of high-speed, high-resolution impulse ink jet printers do not impact so much upon their operation, but indeed impact upon their fabrication. For example, the relatively small size of component parts used in densely packed arrays make them difficult to handle. An easily fabricated ink jet array is, therefore, preferred.

One early approach to the above-described problem is disclosed in U.S. Pat. No. 4,072,959, which issued to Rune Elmqvist. As discussed therein, a recorder operating with drops of liquid includes a comb-shaped piezoelectric transducer arranged such that individual teeth of the comb are associated respectively to a densely-packed array of ink jet chambers. The teeth, actually a series of elongated transducers, are energized by electrodes which apply a field transverse to the axis of elongation. Each of the transducers is immersed in a common reservoir such that energization of one transducer associated with one chamber may produce cross-talk with respect to an adjacent chamber or chambers. In other words, there is no fluidic isolation from chamber to chamber between the various transducers or more accurately, segments of the common transducer. In addition to such cross-talk, the construction shown in the Elmqvist patent poses a requirement for a non-conductive ink.

Layered or laminated ink jet structures have also been utilized to facilitate fabrication of ink jets. For example, U.S. Pat. No. 4,392,145, issued July 5, 1983 to Walter R. Parkola, assigned to the assignee of the present invention and incorporated herein by reference, shows a multi-layer ink jet apparatus which includes a plurality of channels comprising chambers including inlets and orifices and transducers coupled to the chambers. The various channels are located in different layers that stagger with respect to a plane transverse to the layers so as to achieve a high density array of ink jet orifices. In such a manner, the apparatus provides a high degree of precision which is required in densely packed multi-channel impulse ink arrays.

While the edge-wise ejecting orifice arrangement provided by Parkola facilitates the manufacture of such devices, there has been little effort within the prior art to ease the assembly of ink jet printers having droplet ejection orifices in a planar array. Typically in the past, manufacturing of ink jet printers required the use of a plurality of mechanical fasteners such as screws to compress the relatively thick plates forming the ink flow paths against the print head body in order to avoid mechanical cross-talk caused by leakage of ink between chambers in a multi-channel array. Such mechanical fasteners necessitate additional drilling and boring steps which only complicate the assembly process. It would, therefore, be desirable to provide an ink jet apparatus and method for fabricating same which fosters manufacturing expediencies and, at the same time, minimizes mechanical cross-talk and leakage during operation.

SUMMARY OF THE INVENTION

Accordingly, it is a general object of the present invention to provide a multi-channel, high-density array of ink jets. More specifically, it is an ojbect of the invention to provide a multi-channel, high-density array of ink jets which may be readily fabricated.

It is another object of this invention to provide a multi-channel, high-density array of ink jets which fluidically isolates each of the channels thereby minimizing mechanical cross-talk.

It is a further object of the present invention to provide an ink jet apparatus which is substantially leak-free.

In accordance with the above and other objects, a preferred embodiment of the present invention comprises an ink jet apparatus including a plurality of channels or ink flow paths wherein each of the channels includes a chamber, an inlet opening to the chamber, and an ink droplet ejection orifice. The apparatus, in accordance with one important aspect of the invention, comprises a plurality of flexible plates attached to the rigid forward face of a print head, thereby defining the ink flow path for each of the respective channels.

A plurality of lengthwise-expanding transducers, each of which is coupled to a respective chamber to vary its volume for ejection of an ink droplet therefrom, are mounted upon a platform including the rigid forward face and having an opening defined therethrough for expansion and contraction of the transducers. Thereafter, in accordance with a method for fabricating the ink jet apparatus of the present invention, a foot plate which includes a plurality of slots formed therein for guiding respective ones of the transducers is bonded to the rigid forward face.

The ink flow paths are then defined by the plurality of flexible plates, including at least one chamber plate, at least one restrictor plate, and an orifice plate, being aligned over the foot plate and being held together against the rigid forward face by suitable means for compressing the plurality of flexible plates. In accordance with another important aspect of the invention, the compressing means comprises a spring plate forced against the orifice plate by a substantially U-shaped clip. As a result, no additional assembly steps such as drilling and tapping a plurality of holes and inserting screws therein to secure the plates against the print head, are necessary for prevention of mechanical cross-talk between the channels or leakage from the device.

Other objects, advantages and novel features of this invention will become apparent from the following detailed description of a preferred embodiment when considered in conjunction with the accompanying drawings wherein:

DETAILED DESCRIPTION OF A PREFERRED EMBODIMENT

Figure 1:
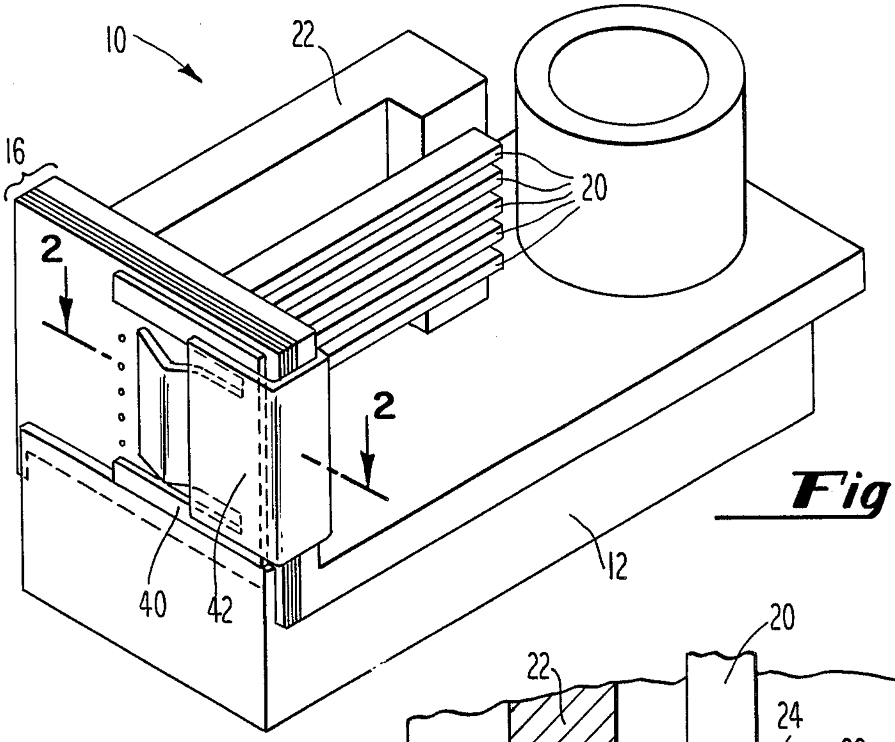
FIG. 1 is an isometric view of a multi-layered ink jet apparatus according to the present invention.
Figure 2:
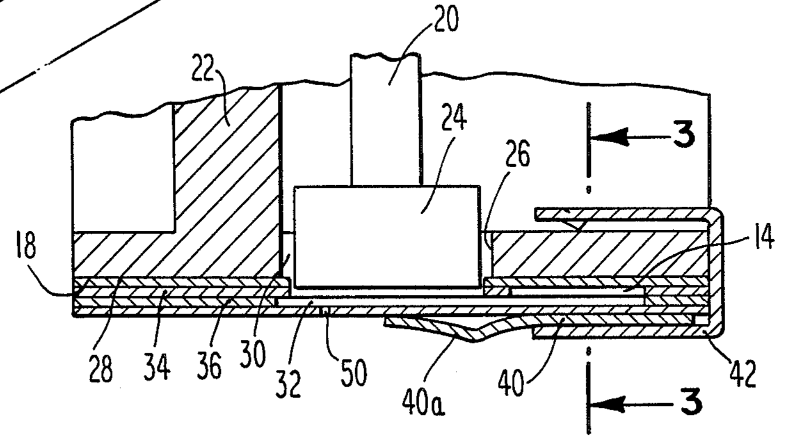
FIG. 2 is a sectional view of the fluidic portion of FIG. 1 taken along the lines 2—2.
Figure 3:
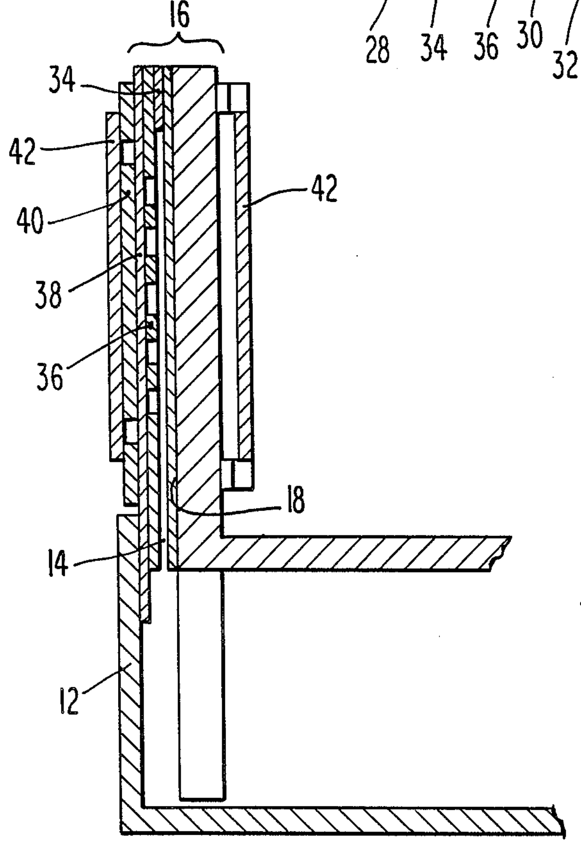
FIG. 3 is a sectional view of the fluidic portion of FIG. 2 taken along the lines 3—3.

Referring now to the drawings, wherein like characters designate like or corresponding parts throughout the several views, there is shown in FIGS. 1—3 an impulse or drop-on-demand ink jet print head 10 including a reservoir 12 which supplies ink through a manifold 14 to a fluidic portion 16 comprised generally of a plurality of flexible plates attached to a forward face 18 of the print head 10 thereby defining a plurality of ink flow paths as is more fully described herein.

A plurality of transducers 20 are mounted within the print head 10 in a manner consistent with the disclosure of the aforedescribed U.S. Pat. No. 4,439,780. That is, each of the transducers 20 are supported at the extremities thereof by a transducer support portion 22 with intermediate portions being essentially unsupported. The transducers 20 are rigidly coupled at their respective extremities remote from the forward face 18 such that expansion and contraction thereof is translated along the length of each transducer 20 and into movement of an attached foot 24 through a respective bearing hole 26 formed in a foot plate 28 which is bonded to the forward face 18 by conventional means.

With reference to FIG. 1, it will be readily appreciated that the mounting means provided by the transducer support portion 22 at the extremities of the transducers 20 remote from the rigid forward face 18 and the bearing means provided by the foot plate 28 at the bearing holes 26 are mutually spaced such that the transducers 20 are substantially unsupported along their length between the extremities thereof thus minimizing cross-talk in accordance with one important aspect of this invention. A conventional viscoelastic potting compound 30 is used to couple each transducer 20 by its attached foot 24 to a respective chamber 32.

As perhaps best shown in FIG. 2, the bearing hole 26 is slightly larger than its respective foot 24. Assuming perfect sizing for the feet 24 and the holes 26, it will be understood that minimal physical contact will be achieved therebetween. In fact, only line or tangential contact will occur between the feet 24 and the holes 26 thus minimizing the possibility of cross-talk. Moreover, it is possible that the viscoelastic material 30 potting the feet 24 could locate each of the feet 24 in the hole 26 so as to preclude any contact whatsoever. However, the contact which is achieved between the feet 24 and the holes 26 is minimal in any event and no special care is taken in the assembly of the apparatus in order to avoid such contact.

The rest of the fluidic portion 16 consists essentially of a stack of relatively thin flexible plates 34,36,38 and 40 which are clamped to the relatively thicker forward face 18 of the print head 10 by a commercial U-clip 42 such as a Tinnerman clip. In order to ensure proper registration, each of the plates 28, 34, 36, and 38 include a pair of holes 44 which permit their respective plate to be mounted to the print head 10 upon a registration pin 46 or the like. Moreover, a notch (not shown) may be provided in each of the plates in order to properly arrange the entire fluidic portion 16.

As shown more clearly in FIGS. 2 and 3, the fluidic portion 16 assembled upon the forward face 18 of the print head 10 defines a plurality of compression chambers 32. In the preferred embodiment of the invention, it will be appreciated that the feet 24 may be secured to the foot plate 28 by means of a resilient rubber-like material, such a silicone which is marketed under the name RTV. The ends of the transducers 20 may be cemented to the feet 24 by means of a suitable adhesive such as, for example, an epoxy. This "potted foot" configuration is presently preferred over the diaphram designs illustrated in the aforementioned references for reasons of reliability and durability. Alternatively, the feet 24 may be omitted, in which case the ends of the transducers 20 themselves are sealed in the bearing holes 26 by the viscoelastic material 30.

In accordance with another important aspect of the invention, the fluidic portion 16 comprised of the plates 28, 34, 36, 38, and 40 are easily fabricated by stacking them upon the registration pins 46 at the forward face 18 of the print head 10. Plate 40 may comprise a bent clamping arrangement which is used to transfer part of the force of the U-clip 42 to the area immediately over the compression chamber region. Alternatively, the U-clip 42 and spring plate 40 may be combined into a single piece.

Figure 4:
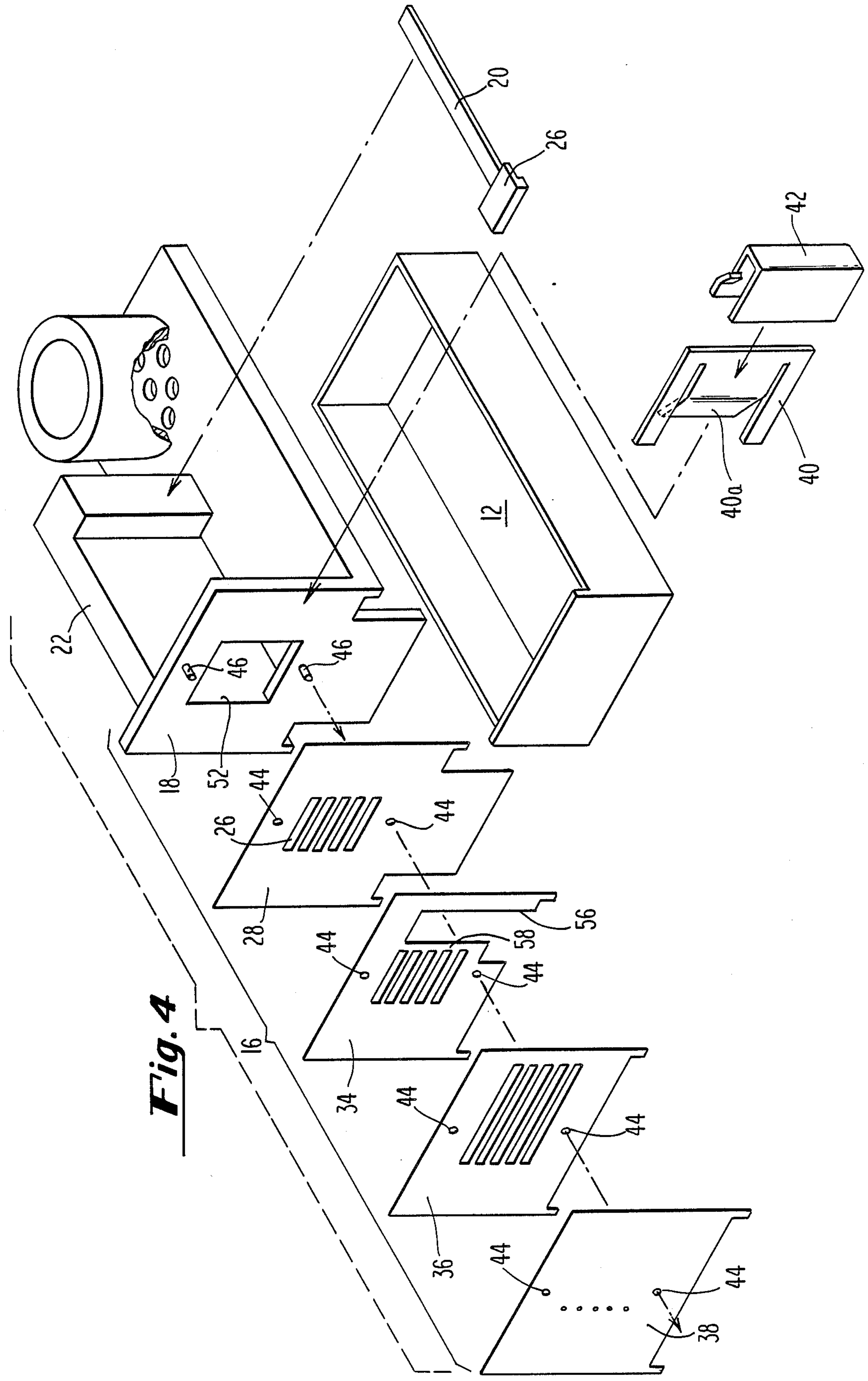
FIG. 4 is an exploded view of the assembled apparatus shown in FIG. 1.

As is conventional, each of the channels include a respective chamber 32, an inlet opening 48 to the chamber 32, an ink droplet ejection orifice 50 from the chamber 32, and the transducer 20 coupled to the chamber 32 by its attached foot 24 and potting compound 30. Referring now to FIG. 4, it can be seen that the forward face 18 of the transducer mounting platform 22 includes an opening 52 through which the transducers 20 expand and contract. The foot plate 28 which is bonded to the forward face 18 also includes a plurality of slots comprising the bearing holes 26 which guide the transducers 20.

The fluidic portion 16 defining the ink flow paths, each of which corresponds to one of the chambers 32, its inlet opening 48 and droplet ejection orifice 50, is formed by first and second plate means. The first plate means, consisting essentially of the chamber plate 34 and restrictor plate 36, includes a plurality of slots 54 in the chamber plate 34 corresponding to the chambers 32, a manifold slot 56 for supplying ink to the inlet openings 48, and a means 58 for restricting the flow of ink from the manifold slot 56 to the inlet openings 48. As such, the chamber plate 34 and restrictor plate 36 cooperatively form the chambers 32, each having a depth corresponding to the combined thickness of the chamber plate 34 and restrictor plate 36. Second plate means comprised of the orifice plate 38 includes an array of orifices 50, situated vetically for example as shown in FIG. 4, while third plate means comprised of the spring plate 40 and U-clip 42 is used to compress the first and second plate means substantially proximate to the array of orifices 50. Each of the plates 28, 34, and 36 may be suitably formed by conventional photo-etching techniques, while the orifice plate 38 is preferably electroformed. The foot plate 28, chamber plate 34 and restrictor plate 36 are preferably formed of stainless steel, while the orifice plate 38 is preferably electroformed of nickle. For purposes of accuracy and fabrication expediency, the width of the slots 54 and orifices 50 are preferably greater than $1\frac{1}{2}$ to 2 times the thickness of their corresponding plates. Moreover, the material selected for the spring plate 40 is selected such that its leaf-spring like protrusion 40*a* is minimized in depth. A high tensile strength material selected to work near its yield strength is suitable for such purposes.

The transducers 20 which have been shown and described herein are elongated and expand and contract along the axis of elongation in response to energization by the application of voltages transversed to the access of elongation. Details concerning such transducers 20 are set forth in U.S. application Ser. No. 576,582 filed Feb. 3, 1984, which is incorporated herein by reference. It will, of course, be appreciated that other transducer configurations may be utilized to generate predetermined patterns through a plurality of orifices in accordance with this invention.

Various inks, both liquid and hot melt or phase change inks, may be employed in the method and apparatus of this invention. Examples of such hot melt and phase change inks are disclosed in U.S. Pat. Nos. 4,390,369 and 4,484,948, as well as pending application Ser. Nos. 668,095, filed Nov. 5, 1984; 644,542, filed Aug. 27, 1984; 672,587, filed Nov. 16, 1984, 909,007, filed Sept. 15, 1986; and 938,334; filed Dec. 3, 1986, now abandoned, and its continuation application Ser. No. 093,151, filed Sept. 2, 1987, each of which is assigned to the assignee of the present invention and is incorporated herein by reference.

Details of the manner in which the reservoir is heated, as well as the print head, for hot melt or phase change inks are disclosed in U.S. Pat. Nos. 4,517,577; 4,544,932; 4,593,292; 4,580,147; and 4,593,294; as well as co-pending application Ser. Nos. 660,656, filed Oct. 15, 1984; 854,332 filed Apr. 21, 1986; 661,922, filed Oct. 16, 1984; 935,645, filed Nov. 26, 1986; 661,034, filed Oct 15, 1984; 661,029, filed Oct. 15, 1984; 661,924, filed Sept. 16, 1984; 667,903, filed Nov. 2, 1984; 661,925, filed Oct. 16, 1984; 661,794, filed Oct. 17, 1984; 669,579, filed Nov. 8, 1984; 660,539, filed Oct. 15, 1984, which are also assigned to the assignee of the present invention and incorporated herein by reference.

Although particular embodiments of the invention have been shown and described and various modifications suggested, it will be appreciated that other embodiments and modifications which fall within the true spirit and scope of the invention as set forth in the appended claims will occur to those of ordinary skill in the art.

What is claimed is:

1. An ink jet print head comprising a plurality of channels formed by a plurality of flexible plates defining a plurality of ink paths, each said ink flow path including a compression chamber, an inlet opening to said chamber, and a droplet ejection orifice from said chamber, rigid means for supporting a plurality of transducers, each said transducer coupled to a respective one of said chambers in order to vary its volume thereby ejecting droplets of ink from said orifice, and means for clamping said plurality of plates to said support means, said clamping means applying a clamping force to said plurality of plates proximate to said compression chambers of each said channel.

2. The print head according to claim 1, wherein said inlet opening to said chamber further comprises means for restricting the flow of ink to said chamber.

3. The print head according to claim 1, wherein said support means comprises:

a transducer mounting platform including a rigid planar portion having an opening defined therethrough for expansion and contraction of said transducers; and a foot plate bonded to said rigid planar portion, said foot plate having a plurality of slots formed therein for receiving respective ones of said plurality of transducers.

4. The print head according to claim 3, further comprising a plurality of transducer feet attached to respective ones of said plurality of transducers, each said foot coupling its respective transducer to one of said slots formed in said foot plate.

5. The print head according to claim 4, further comprising means for potting each said foot to its respective slot.

6. The print head according to claim 5, wherein said potting means comprises a silicone rubber.

7. The print head according to claim 1, wherein said plurality of flexible plates comprises:
a chamber plate;
a restrictor plate;
an orifice plate; and
a spring plate.

8. The print head according to claim 7, further comprising means for clamping said chamber plate, said restrictor plate, said orifice plate, and said spring plate to said support means.

9. The print head according to claim 8, wherein said clamping means comprises a substantially U-shaped clip adapted to receive said support means, said chamber plate, said restrictor plate, said orifice plate, and said spring plate.

10. The print head according to claim 9, wherein said U-shaped clip comprises a Tinnerman clip.

11. The print head according to claim 7, wherein said spring plate comprises an outer frame portion supporting a deflected leaf spring.

12. The print head according to claim 11, wherein said outer frame portion and said leaf spring are comprised of a material having a high tensile strength.

13. The print head according to claim 12, wherein said leaf spring is deflected to a point substantially approaching the material's yield strength.

14. A method for fabricating an ink jet apparatus comprising a plurality of channels, each of said channels including a chamber, an inlet opening to said chamber, a droplet ejection orifice from said chamber, and a transducer coupled to said chamber in order to vary its volume thereby ejecting droplets of ink from said orifice, wherein said method comprises the steps of:
forming a transducer mounting platform which includes a rigid planar portion having an opening defined therethrough for expansion and contraction of said transducers;
bonding a foot plate to said rigid plane portion, said foot plate including a plurality of slots formed therein for guiding respective ones of said transducers;
defining a plurality of ink flow paths through a plurality of flexible plates, said ink flow paths each corresponding to one of said chambers, its inlet opening, and droplet ejection orifice; and
clamping, in the immediate vicinity of each said chamber, said plurality of plates defining said ink flow paths against said rigid planar portion to substantially conform therewith.

15. The method according to claim 14, wherein said defining step further comprises restricting each of said inlet openings to control the flow of ink therethrough.

16. The method according to claim 15, wherein said defining step comprises:
forming first plate means which includes a plurality of slots therethrough comprising said chambers, a manifold slot for supplying ink to said inlet openings, and means for restricting the flow of ink from said manifold slot to said inlet openings; forming second plate means which includes an array of holes therethrough comprising said droplet ejection orifices; and
forming third plate means for compressing said first and second plate means substantially proximate to said array of holes comprising said droplet ejection orifices.

17. The method according to claim 16, wherein said step forming said first plate means comprises:
forming a chamber plate having a plurality of slots therethrough which define said chambers proximate to said foot plate; and
forming a restrictor plate having a plurality of slots substantially aligned with said plurality of slots in said chamber plate, but said plurality of slots in said restrictor plate extending over same manifold slot in said chamber plate;
wherein said chamber plate and said restrictor plate cooperatively form said chambers, each having a depth corresponding to the combined thickness of said chamber plate and said restrictor plate, said restricting means comprising that portion of said chamber plate and that portion of said slot in said restrictor plate between said plurality of slots defining said chambers proximate to said foot plate and said manifold slot formed therein.

18. The method according to claim 17, wherein said first plate means comprises a plurality of said chamber plates and said restrictor plates.

19. The method according to claim 16, wherein said step forming said third plate means comprises:
forming a spring plate having an outer frame portion and an inner leaf spring portion;
forming said leaf spring portion inwardly towards said orifice plate; and
clamping said leaf spring portion so it bends outwardly from said outer frame portion to a point substantially approaching its yield strength.

20. The method according to claim 19, wherein said clamping step comprises:
assembling and aligning said plurality of flexible plates defining said ink flow paths with said rigid planar portion;
assembling and aligning said spring plate against the outermost of said flexible plates; and
sliding said U-shaped clip with said spring plate over said rigid planar portion, said foot plate bonded to said rigid planar portion, and said aligned plate and said spring plate such that said inwardly deflected leaf spring provides a compressive force adjacent to said array of holes comprising said droplet ejection orifices.

21. Ink jet printing apparatus, comprising:
first flexible plate means for forming a plurality of compression chambers, each said chamber including an inlet opening thereto for receiving a supply of ink;
second flexible plate means, overlying said first flexible plate means, for forming a plurality of droplet ejection orifices, each said orifice adapted to be fluidically coupled to a respective one of said chambers;
a plurality of transducers, each said transducer coupled to a respective one of said chambers in order to vary its volume thereby ejecting droplets of ink from said orifice;
a transducer mounting platform including a rigid planar portion having an opening defined therethrough for expansion and contraction of said transducers; and
means for clamping said first and second flexible plates to said rigid planar portion of said transducer mounting platform, said clamping means applying a clamping force immediately adjacent to each said chamber.

22. The ink jet printing apparatus according to claim 21, further comprising:

third flexible plate means, bonded to said rigid planar portion, for forming a plurality of slots each of which is adapted to guide a respective one of said transducers; and fourth flexible plate means, adapted to be inserted between said first and second flexible plate means, for restricting the inlet opening of each said chamber.

23. The ink jet printing apparatus according to claim 21, wherein said chambers with said orifices comprise a linear array and said clamping means comprises a clip having an inwardly projecting spring portion adapted to apply said clamping force only along a line which is parallel to said linear array.

* * * * *

UNITED STATES PATENT AND TRADEMARK OFFICE
CERTIFICATE OF CORRECTION

PATENT NO. : 4,779,099

DATED : October 18, 1988

INVENTOR(S) : Arthur M. Lewis

It is certified that error appears in the above-identified patent and that said Letters Patent is hereby corrected as shown below:

Column 8, line 9
Please change the word "same" to --said--.

Signed and Sealed this

Seventh Day of March, 1989

*Attest:*

DONALD J. QUIGG

*Attesting Officer*

*Commissioner of Patents and Trademarks*